UNITED STATES PATENT OFFICE 2,517,732

PREPARATION OF KETONES BY CATALYTIC REACTION OF ETHYLENE AND ALDEHYDES

Charles H. Stiteler, Philadelphia, Pa., and Julian R. Little, Passaic, N. J., assignors to United States Rubber Company, New York, N. Y., a corporation of New Jersey No Drawing. Application March 13, 1947, Serial No. 734,536

1 Claim. (Cl. 260—597)

This invention relates to improvements in the preparation of ketones.

According to United States Patent 2,402,137, so-called telomerization reactions of ethylene with saturated alcohols, aldehydes, ketones, acid esters, acid anhydrides, ethers or acetals are carried out at high pressures in the presence of a peroxygen-type catalyst to give polymers which range from soft greases to hard waxes.

According to the present invention, ethylene and certain functionally aliphatic aldehydes, namely, n-alkanals, sec-alkanals, cycloalkanecarboxaldehydes and aralkanals, containing 2 to 8 carbon atoms, are made to react under conditions which will give ketones liquid at room temperature having the formula

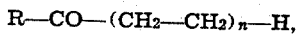

$$R-CO-(CH_2-CH_2)_n-H,$$

where R is the n-alkyl, sec-alkyl, cycloalkyl or aralkyl radical containing 1 to 7 carbon atoms of the aldehyde reactant, and $n$ is an integer from 1 to 6.

The process of our invention is carried out by subjecting a non-aqueous liquid mixture containing the aldehyde and ethylene and a catalytic material which will decompose to give free radicals to pressures from 200 to 2500 pounds per square inch, preferably between 600 and 2200 pounds per square inch, and temperatures of about 25° C. to 150° C., preferably between 70° C. and 140° C., the temperature employed being sufficient to effect decomposition of the catalyst with consequent production of free radicals. The reaction may be carried out in the absence or presence of an inert diluent, such as n-hexane, cyclohexane, or benzene. The ratio of aldehyde to ethylene in the initial reaction mixture should be 0.3 to 5 mols of aldehyde per mol of ethylene. The higher the ratio of aldehyde to ethylene within said range, the larger will be the proportion of lower boiling ketones formed, that is, the larger the proportion of compounds of the formula $R-CO(CH_2-CH_2)_n-H$, where $n$ is 1, 2 and 3. The reaction is carried out until a substantial amount of the reactants has been coverted to the liquid ketone product. As the reaction proceeds, ethylene disappears by reaction with the aldehyde and it is preferable to maintain the original pressure by addition of ethylene to the reaction mixture. Completion of the reaction is indicated when the absorption of ethylene and the concurrent drop in pressure ceases. While the length of time that the reaction is allowed to proceed naturally depends on various factors such as the temperatures and pressures used, the aldehyde and catalyst employed, and the acceptable yield of ketone produced, generally the time of reaction may be from 1 to 50 or more hours. The reaction products may be purified by removal of the unreacted starting materials and fractional distillation of the residue.

Examples of aldehyde suitable for the process of our invention are acetaldehyde, propionaldehyde, butyraldehyde, isobutyraldehyde, heptaldehyde, octaldehyde, cyclopentanecarboxaldehyde, cyclohexanecarboxaldehyde, phenylacetaldehyde. Examples of catalysts suitable for the process of our invention which will decompose to give free radicals are peroxygen-type catalysts, viz: organic peroxides, e. g. acyl peroxides, such as diacetyl peroxide, dibenzoyl peroxide, acetyl benzoyl peroxide, and alkyl peroxides, such as tertiary-butyl hydroperoxide; hydrogen peroxide; per-salts, e. g. alkali persulfates, alkali perborates, alkali percarbonates; hydrazine derivatives, e. g. hydrazine sulfate, hydrazine hydochloride, dibenzoyl hydrazine; organo-metallic compounds which decompose thermally to give free radicals, e. g. tetraethyl-lead. The organic peroxides are the present preferred catalysts for the process of the present invention. The amount of catalyst employed is not critical, generally 0.5 to 15 mol percent of the ethylene reactant (i. e. total ethylene added to the reaction mixture) being satisfactory. The type of catalysts exemplified above which will decompose to give free radicals are well known and should not be confused with Friedel-Crafts type catalysts, such as aluminum chloride, boron trifluoride, and acids such as sulfuric and hydrofluoric acids, which are not effective in the present process to give the liquid low molecular weight ketones of the present invention. Conversely, as known, the catalysts used in the process of the present invention are not effective as catalysts in Friedel-Crafts reactions.

The following examples are illustrative of our invention, all parts being by weight:

Example I

A mixture of 495 parts of acetaldehyde, 230 parts of ethylene and 2.0 parts of dibenzoyl peroxide was heated at 80–84° C. in an autoclave of approximately 1200 millilitres capacity. The initial pressure of approximately 800 pounds per square inch was maintained throughout the reaction by injection of additional ethylene to compensate for the ethylene which had reacted with acetaldehyde. After approximately 20 hours no further absorption of ethylene occurred and the reaction was terminated by cooling to room temperature.

After venting unreacted ethylene, the vessel was opened and the liquid reaction mixture was fractionally distilled to yield unreacted acetaldehyde; 24 parts of methyl ethyl ketone, B. Pt. 79.3–79.8° C./760 mm.; 16 parts of methyl n-butyl ketone, B. Pt. 128–129° C./760 mm.; 10 parts of methyl n-hexyl ketone, B. Pt. 172–173° C./760 mm.; and 13 parts of higher boiling liquid ketones. The identities of the methyl ethyl ketone and the methyl n-butyl ketone were confirmed by their 2,4-dinitrophenyl hydrazine derivatives which melted at 107–109° C. and 106–107° C. respectively. The identity of the methyl n-hexyl ketone was confirmed by its semi-carbazone derivative which melted at 172–173° C.

*Example II*

A mixture of 441 parts of n-butyraldehyde and 5.0 parts of benzoyl peroxide was heated at 70° C. in a 1200 ml. autoclave together with ethylene at a pressure of 750 pounds per square inch. The reaction was carried out for 20 hours during which time the original pressure was maintained by the injection of additional increments of ethylene.

At the end of the reaction, the unreacted ethylene in the reaction mixture was vented and the unreacted butyraldehyde was removed by distillation. The liquid residue was fractionally distilled to yield 34.9 parts of n-propyl ethyl ketone and 26.9 parts of n-butyl n-propyl ketone together with some higher-boiling ketones.

In view of the many changes and modifications that may be made without departing from the principles underlying the invention, reference should be made to the appended claim for an understanding of the protection afforded the invention.

Having thus described our invention, what we claim and desire to protect by Letters Patent is:

The process of simultaneously producing methyl ethyl ketone, methyl n-butyl ketone and methyl n-hexyl ketone which consists in heating a non-aqueous reaction mixture comprising acetaldehyde and ethylene in relative proportions corresponding to approximately 1.36 mols acetaldehyde per mol of ethylene in the presence of dibenzoyl peroxide as a catalyst at a temperature of from 80° to 84° C. and at an initial pressure of approximately 800 pounds per square inch for approximately 20 hours, maintaining the pressure at approximately 800 pounds per square inch throughout the reaction by injection of additional ethylene, then discontinuing the reaction, and isolating methyl ethyl ketone, methyl n-butyl ketone and methyl n-hexyl ketone from the reaction mixture.

CHARLES H. STITELER.
JULIAN R. LITTLE.

REFERENCES CITED

The following references are of record in the file of this patent:

UNITED STATES PATENTS

| Number | Name | Date |
|---|---|---|
| 2,373,561 | Hanford | Apr. 10, 1945 |
| 2,391,218 | Bacon et al. | Dec. 18, 1945 |
| 2,402,137 | Hanford et al. | June 18, 1946 |
| 2,423,497 | Harmon | July 8, 1947 |
| 2,432,287 | Cramer | Dec. 9, 1947 |
| 2,440,800 | Hanford et al. | May 4, 1948 |